(12) United States Patent
Gartelmann

(10) Patent No.: US 8,393,570 B2
(45) Date of Patent: Mar. 12, 2013

(54) LANDING FLAP KINEMATICS DRIVEN BY WAY OF A PINION DRIVE

(75) Inventor: Rainer Gartelmann, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 163 days.

(21) Appl. No.: 12/743,895

(22) PCT Filed: Nov. 21, 2008

(86) PCT No.: PCT/EP2008/009884
§ 371 (c)(1),
(2), (4) Date: Jul. 12, 2010

(87) PCT Pub. No.: WO2009/065597
PCT Pub. Date: May 28, 2009

(65) Prior Publication Data
US 2010/0308162 A1    Dec. 9, 2010

(30) Foreign Application Priority Data
Nov. 21, 2007  (DE) .......................... 10 2007 055 669

(51) Int. Cl.
*B64C 13/00*    (2006.01)

(52) U.S. Cl. .................. 244/99.3; 244/214; 244/215

(58) Field of Classification Search .................. 244/213, 244/214, 215, 216, 217, 218, 99.3
See application file for complete search history.

(56) References Cited

U.S. PATENT DOCUMENTS

| 1,868,748 | A |   | 7/1932  | Hogan              |
|-----------|---|---|---------|--------------------|
| 2,146,014 | A | * | 2/1939  | Grant ........... 244/216 |
| 2,222,187 | A | * | 11/1940 | Weatherbee ...... 244/216 |
| 2,325,548 | A |   | 7/1943  | Roos               |
| 2,966,808 | A |   | 1/1961  | Grudin             |
| 3,698,668 | A | * | 10/1972 | Cole ............ 244/219 |
| 4,131,253 | A |   | 12/1978 | Zapel              |
| 4,471,928 | A | * | 9/1984  | Cole ............ 244/215 |
| 4,742,730 | A |   | 5/1988  | Dorn et al.        |
| 5,098,043 | A |   | 3/1992  | Arena              |
| 6,231,012 | B1 |  | 5/2001  | Cacciola           |

FOREIGN PATENT DOCUMENTS

| DE | 605554    | C  | 11/1934 |
|----|-----------|----|---------|
| DE | 2839050   | A1 | 3/1979  |
| DE | 19501038  | C1 | 5/1996  |
| GB | 558047    | A  | 12/1943 |
| GB | 941904    | A  | 11/1963 |
| WO | 8500573   | A  | 2/1985  |
| WO | 9743557   | A1 | 11/1997 |

OTHER PUBLICATIONS

International Search Report for corresponding PCT application PCT/EP08/009884, dated Apr. 9, 2009.

(Continued)

*Primary Examiner* — Timothy D Collins
*Assistant Examiner* — Jamie S Stehle
(74) *Attorney, Agent, or Firm* — Matthew B. Dernier, Esq.; Gibson & Dernier LLP

(57) ABSTRACT

The invention relates to a device for moving a trailing edge flap of an aircraft wing, in which device the trailing edge flap comprises one or several flap segments, wherein a first flap segment is movably mounted on the wing and is connected to a first toothed movement element that is moved by means of a first pinion.

14 Claims, 5 Drawing Sheets

OTHER PUBLICATIONS

International Preliminary Report on Patentability and Written Opinion for corresponding PCT application PCT/EP08/009884, dated Jun. 1, 2010.

Office Action for corresponding CN Application No. 200880117304.9, dated Sep. 5, 2012.

* cited by examiner

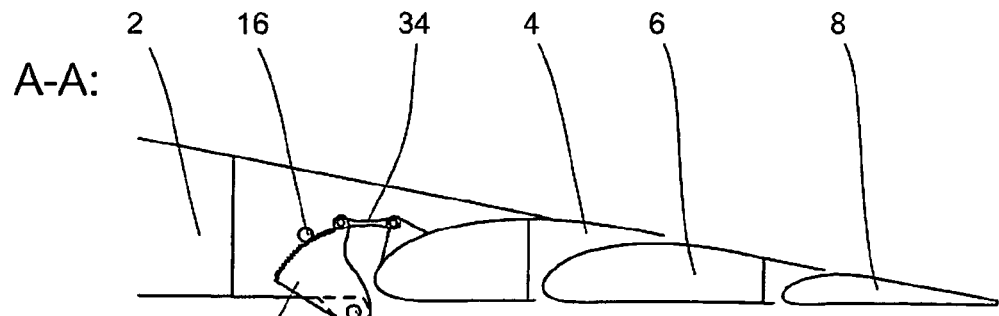
A-A: Fig. 2a
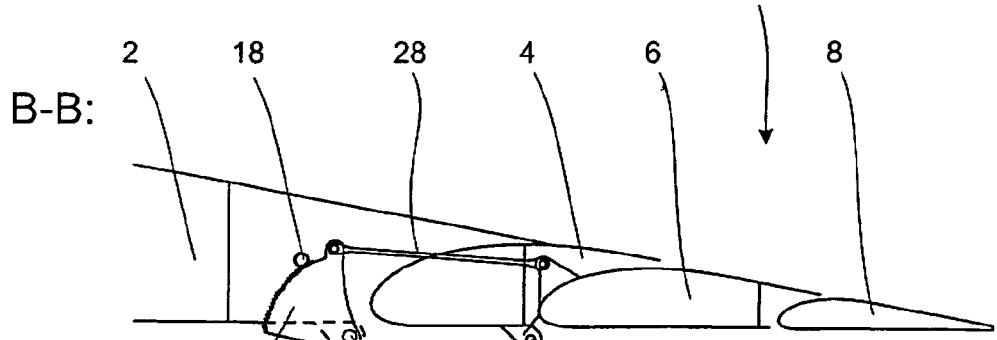
B-B: Fig. 2b
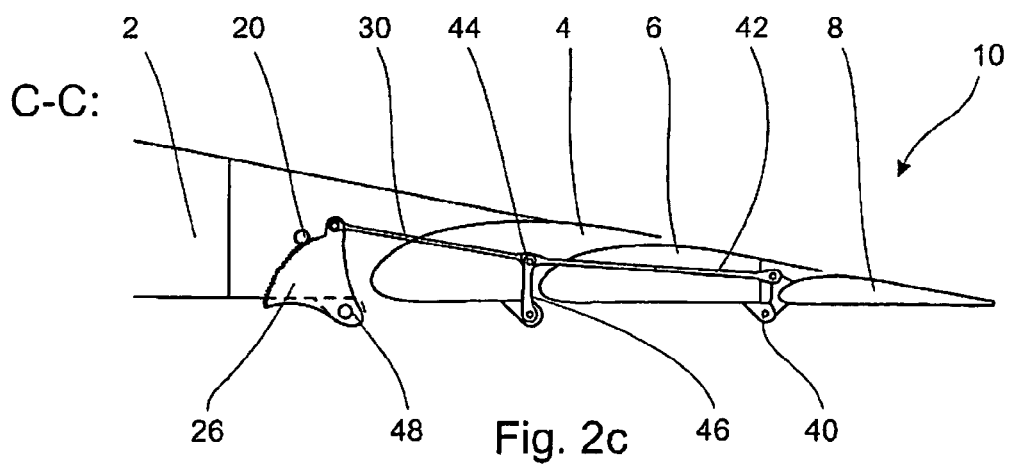
C-C: Fig. 2c

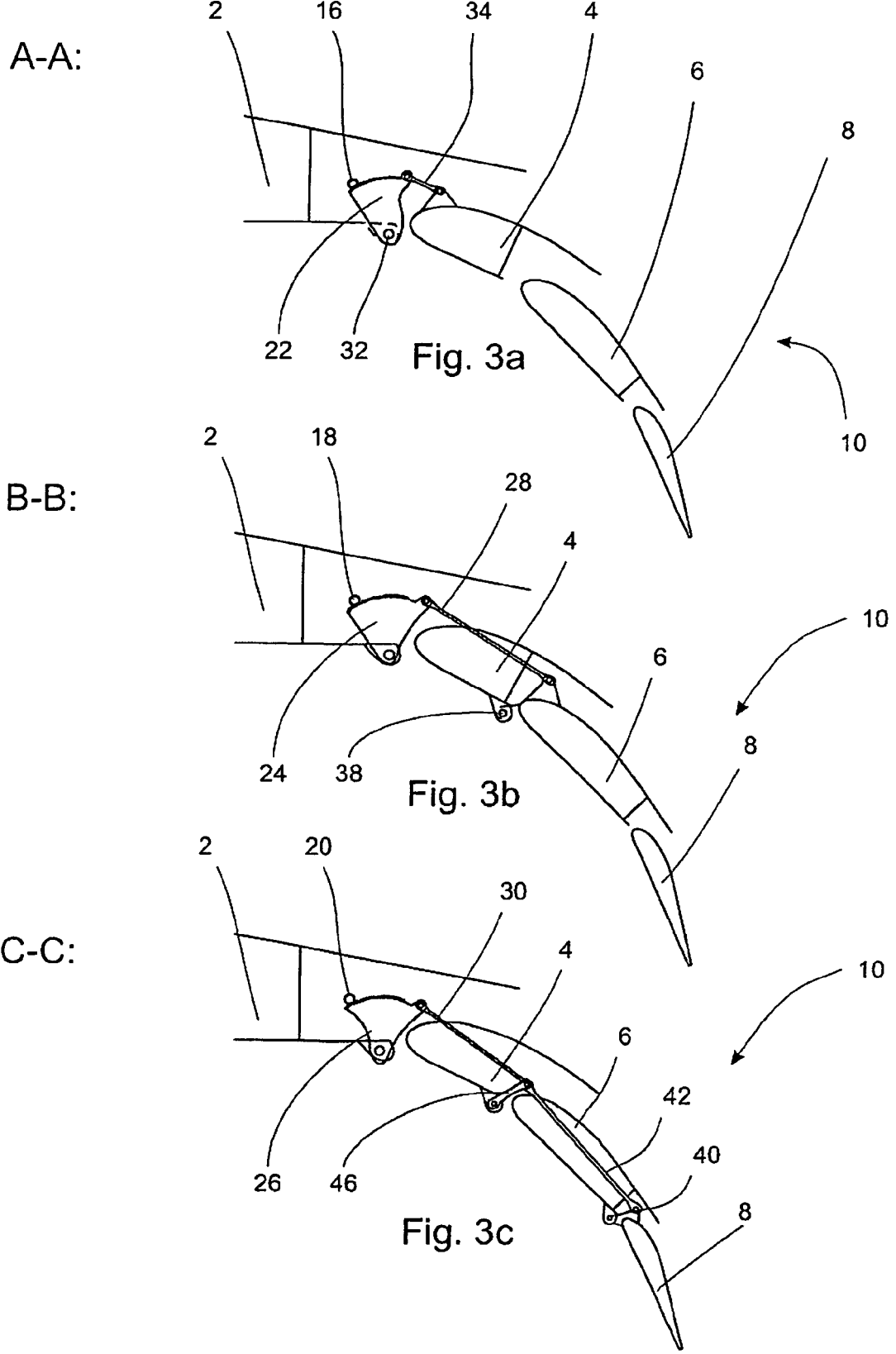

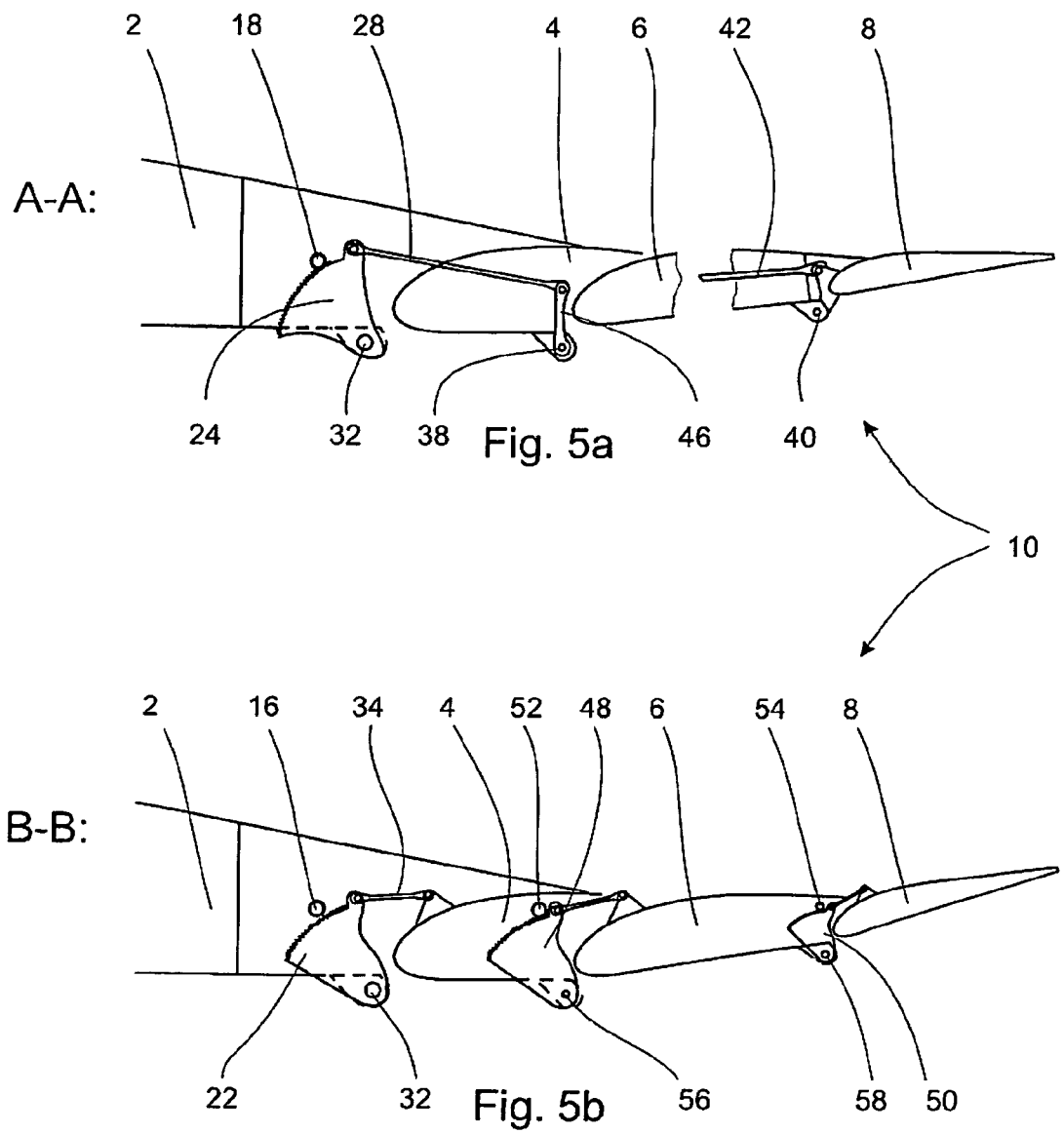

LANDING FLAP KINEMATICS DRIVEN BY WAY OF A PINION DRIVE

BACKGROUND

The invention relates to a device for moving a trailing edge flap of an aircraft wing, in which device the trailing edge flap comprises one or several flap segments.

Documents US-A-4 131 253, GB 941 904 A, DE 605 554 C, US-A-1 868 748, DE 28 39 050 A1 and WO 85/00573 A describe a device for moving a trailing edge flap of an aircraft wing.

Such devices are preferably designed in such a way that the kinematics of a trailing edge flap and its drive optimally co-operate to bring about a desired movement sequence and a predetermined deflection of the trailing edge flap. In this arrangement preferred drive types have established themselves, for example helical, hydraulic or angular gear arrangements. In helical or angular gear arrangements drive trains extend through a large region of the wings from a central drive unit, which is situated in the region of the wing-to-fuselage transition, to the trailing edge flaps. At the same time the kinematics of the trailing edge flaps to be moved are often implemented by means of expensive guiding devices with rails or rollers. Generally speaking, the above-mentioned drives and the associated kinematics require installation space or have a radius of action.

In the case of kinematics and their drives that should take up a particularly small design space it is necessary for the design height and the radius of action of the drive to be relatively small. Conventional helical, hydraulic or angular gear arrangements and the associated kinematics cannot meet these requirements for particularly small design space. In particular, the construction elements required for the kinematics cannot be completely integrated in the wing contour so that they preferably project from the bottom of the wing and are covered by flap track fairings.

SUMMARY OF THE INVENTION

It is the object of the invention to reduce or eliminate the disadvantages mentioned. In particular, it is the object of the invention to propose a device for moving a trailing edge flap of an aircraft wing, which device comprises a particularly compact design, with its bearing arrangement and kinematics being able to be almost completely integrated in the wing contour.

This object is met by a device for moving a trailing edge flap of an aircraft wing, in which the trailing edge flap comprises one or several flap segments, wherein a first flap segment is movably mounted on the wing and is connected to a toothed movement element that is moved by a first pinion.

This device is associated with an advantage in that it involves a particularly compact design, because, as a result of a pinion that engages a toothed movement element, the drive can be designed so as to be significantly more compact than a helical, angular or hydraulic gear arrangement. The toothed movement element can, for example, be integrated in a flap segment so that it is located entirely within the respective flap segment or is covered by the external dimensions of the flap segment. The pinion can also be arranged relative to the flap segment in such a manner that at least in the cruising position or with the flap segment fully retracted it does not project beyond the dimensions of the trailing edge flap. Apart from the direct arrangement of the components within the trailing edge it is, however, also possible to arrange the pinion drive at some other position within the wing and to transmit movement of the toothed movement element to the flap segment by way of a push rod. The design of the kinematics of the device according to the invention only slightly interferes, or does not interfere at all, with the harmonious and aerodynamic shape of the trailing edge flap, so that it advantageously differs from the devices common in the state of the art.

Preferably the trailing edge flap to be moved comprises more than just the first flap segment. In order to achieve the highest possible lift coefficient during takeoff and landing of the aircraft concerned, an increase in the area and in the curvature of the wing is necessary. This requirement can be met by a multitude of flap segments that can move relative to each other. At the same time, segmentation of the trailing edge flap makes it possible to create gaps that can delay or eliminate break away of flow at the top of the wing by the supply of an airstream rich in energy. The number of the flap segments depends on the required lift performance of the wing and the aerodynamic airflow around said wing. It has been shown that in some aircraft a single flap segment is already sufficient for the purpose of generating high lift, while in other aircraft two or three flap segments are required for this. The specific number of flap segments is not determined by the device according to the invention but is subject to the required aerodynamic concept arrived at by an average person skilled in the art.

Possible toothed movement elements include, for example, toothed racks or toothed discs which by means of a meshing rotating pinion transmit the drive forces to the respective flap segment and in a defined manner specify the movement sequence of the flap segment.

It is particularly advantageous to implement a bearing arrangement of the respective flap segment by means of a hinge whose hinge axis is preferably aligned so as to be essentially parallel to the trailing edge so that by driving a toothed disc or a toothed rack that are arranged at the flap segment, or by a push rod driven by the aforesaid, a rotational movement of the flap segment can take place. In this arrangement it is advantageous if the pinion is arranged at the largest possible distance from the hinge axis of the respective flap segment in order to obtain low drive moments for the pinion, and in this way obtain a drive unit of compact dimensions.

With the use of several flap segments it is advantageous to provide a central drive unit with several transmission units that are functionally separate from each other, which transmission units are associated with the respective flap segment. Each one of these transmission units controls the associated flap segment by way of its own pinion that transmits the forces and movement by way of a toothed disc and a push rod to the flap segment. The gearing of each transmission unit is designed for the movement sequence of the respective flap segment. The individual transmission units can preferably be coupled and locked separately of each other.

BRIEF DESCRIPTION OF THE DRAWINGS

Below, the invention is explained in more detail with reference to the figures. In the figures, identical items are denoted by the same reference characters. Two exemplary embodiments are presented, each comprising three flap segments. The following are shown:

FIG. 2a-c: lateral section views of a first exemplary embodiment of the device according to the invention in the normal position;

FIG. 3a-c: lateral section views of the first exemplary embodiment of the device according to the invention in the high lift position;

FIG. 5a-b: lateral section views of the first and of the second exemplary embodiments in an exemplary cruising position.

DETAILED DESCRIPTION OF THE INVENTION

Figure 1:
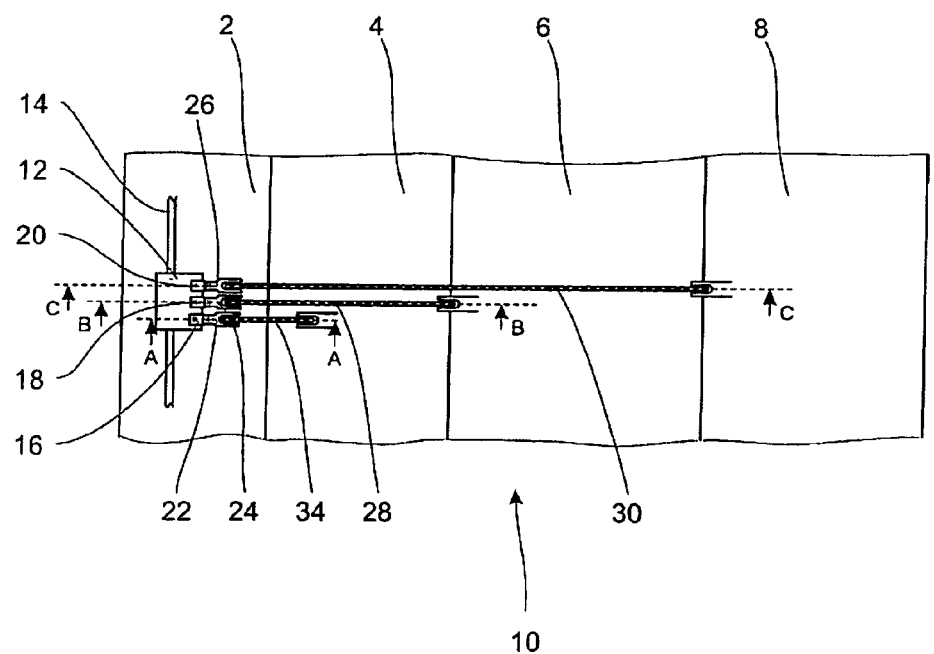
FIG. 1: a top view of the device according to the invention.

FIG. 1 shows a wing 2 with a trailing edge flap 10 that comprises three flap segments 4, 6 and 8. In this exemplary embodiment a central drive 12 is arranged so as to be fixed to the wing, into which central drive 12 two input shafts 14 lead, which are, for example, driven by one or several electric motors. As an alternative to this the drive can take place by means of a central hydraulic drive as is the case in conventional high lift systems with a shaft transmission for both wings. The latter alternative would require shaft guidance up to the wing-to-fuselage transition of the aircraft.

The central drive 12 drives three pinions 16, 18 and 20, which in turn interact with three toothed discs 22, 24 and 25 that preferably on a circumferential section facing the respective pinion 16, 18 and 20 comprise a tooth arrangement. At hinge points (not visible in FIG. 1) the toothed discs 22, 24 and 26 are mounted on the bottom of the central drive 12 or on the wing 2. The pinions 16, 18 and 20 transmit the drive moments and the movements to the flap segments 4, 6 and 8 by way of the toothed discs 22, 24 and 26. To this effect, as an example, the toothed discs 22, 24 and 26 in each case transmit their movements to the flap segments 4, 6 and 8 by way of a push rod 28, 30 and 34.

The central drive is preferably divided into individual transmission units, each separately driving an associated flap segment. In a three-part flap the central drive 12 thus comprises three transmission units. The energy supply to the central drive 12 is by way of the shafts 14. Since the individual flap segments are deflected to different extents, each transmission unit associated with the flap segment comprises different, individual, gearing. The individual transmission units are preferably braked or coupled or decoupled by way of electromechanical elements so that each individual flap segment 4, 6 and 8 can be individually controlled and driven. As a result of the individual separate transmission units of the central drive 12 and the individual coupling to the flap segments 4, 6 and 8 the drive loads are decoupled from each other. This means that each transmission unit only takes up the drive load of the associated flap segment 4, 6 or 8, and accordingly the drive load of the complete trailing edge flap 10 is spread over several drive units.

The sectional planes designated A-A, B-B and C-C in FIG. 1 are shown in detail in FIGS. 2a, 2b and 2c.

FIG. 2a shows the sectional plane A-A in which the flap segments 4, 6 and 8 that are arranged one behind another are depicted. The toothed disc 22 is rotatably mounted on the wing 2 by means of a hinge 32 and is moved by means of the interacting pinion 16. As an example, the toothed disc 22 is connected to the flap segment 4 by way of a push rod 34 which transmits the movement of the toothed disc 22 to the flap segment 4. Accordingly, as a result of the pinion 16 being driven, the flap segment 4 can be deflected away from the wing 2, or it can be retracted towards the wing 2. The movement components in horizontal and vertical direction of the flap segment 4 are determined by the curvature of the tooth arrangement of the toothed disc 22 and the position of the hinge 32 relative to the wing 2 or to the flap segment 4 in the retracted state. These parameters are designed in such a way that with the flap segment 4 completely deflected a gap with a predetermined gap width arises if this is required for generating high lift.

FIG. 2b shows the sectional plane B-B and shows in more detail the manner in which the flap segment 6, which follows opposite to the direction of flight, can be deflected relative to the flap segment 4. To this effect a toothed disc 24 is rotatably mounted on a hinge 36. The hinge 36 is arranged on the housing of the central drive 12 or on the wing 2. The toothed disc 24 is joined in an articulated manner to the flap segment 6 by way of a push rod 28. Rotation of the flap segment 6 takes place by way of the hinge 38 that is attached to the flap segment 4.

Rotation of the toothed disc 24 by driving the pinion 18 thus results in deflection of the push rod 28, which triggers rotation of the flap segment 6 on the hinge 38. As a result of this the flap segment 6 is deflected or retracted relative to the flap segment 4 that is situated forward in the direction of flight. Here again the movement sequence of the flap segment 6 relative to the flap segment 4 depends on the positioning of the hinge 38 and with a corresponding design results in a gap between the flap segments 4 and 6, if desired, when the flap segment 6 is extended.

FIG. 2c shows the sectional plane C-C and shows the manner in which the flap segment 8 is controlled by the central drive 12. The flap segment 8 is rotatably connected to the flap segment 6 by way of the hinge 40. The push rods 30 and 42 connect the flap segment 8 to the central drive 12, wherein a control arm 46 mounted at an articulation point 44 transmits the relative movement from the flap segment 4 and the wing 2 to the push rods 30 and 42. The push rod 30 is connected to the toothed disc 26, which is rotatably mounted in the hinge point 48. The hinge point 48 is located on the housing bottom of the central drive 12 or on the wing 2.

Control from the central drive 12 takes place by way of the pinion 20 onto the toothed disc 26 and its connection by way of the push rods 30 and 42 with the flap segment 8. Consequently the flap segment 8 is deflected relative to the flap segment 6 by rotating the pinion 20. Again a gap between the flap segments 8 and 6 in high lift can be provided, if desired, by means of a corresponding design.

FIGS. 3a-c, in which the trailing edge flap 10 of the wing 2 comprises a high-lift position as a result of deflected flap segments 4, 6 and 8, are provided to clarify deflection of the flap segments 4, 6 and 8.

FIG. 3a shows in the sectional plane A-A the manner in which the toothed disc 22 is completely rotated on the hinge 32 by the pinion 16. By way of the connection of the toothed disc 22 and the flap segment 4 by means of the push rod 34 the flap segment 4 is deflected relative to the wing 2. In FIG. 3a the hinge axis 32 of the toothed disc 22 is identical to the hinge axis of the flap segment 4. However, this is not mandatory; the flap segment 4 can also comprise a hinge axis that is separate of the hinge axis 32.

FIG. 3b shows the extended end position of the flap segment 6 in the sectional plane B-B. This end position was achieved by rotation of the toothed disc 24 that is controlled by the central transmission 12 by way of the pinion 18. The total movement, i.e. the inclination and the deflection, of the flap segment 6 is more pronounced than that of the flap segment 4, which has been achieved both as a result of the transmission gearing and of a corresponding selection of the linkage points.

Movement of the flap segment 8 according to FIG. 3c in the sectional plane C-C takes place according to the same principle. Here again, as a result of the transmission ratio and the selection of the linkage points the movement and end position of the flap segment 8 are greater than those of the flap segments 6 and 4 arranged further forward.

In the illustrations of FIGS. 3a-c the trailing edge flap 10 comprises a larger surface and greater curvature than in the retracted state in FIGS. 2a-c. Again there are, for example, gaps between the wing 2 and the flap segments 4, 6 and 8, which gaps can delay or eliminate breakaway of flow at the top of the trailing edge flap 10 by supplying energy-rich airflow from the underside of the wing 2.

Figure 4A:
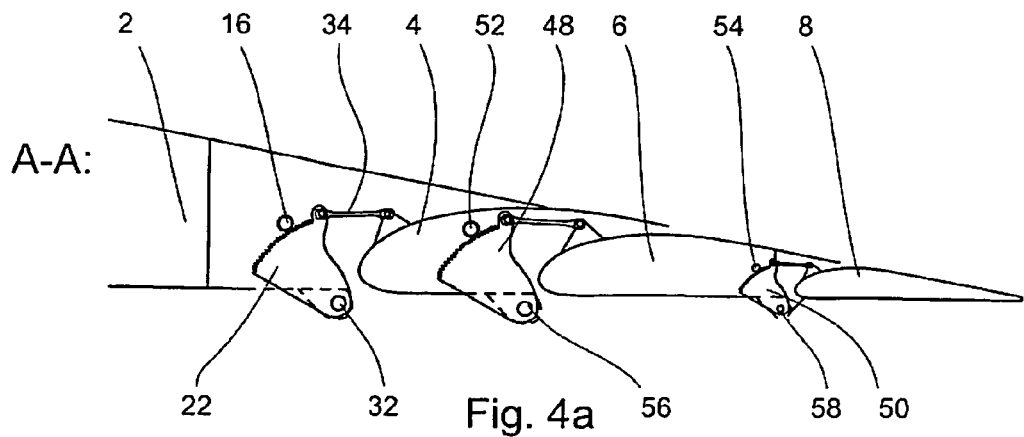
FIG. 4a-b: lateral section views of a second exemplary embodiment in the normal position and in the high lift position.
Figure 4B:
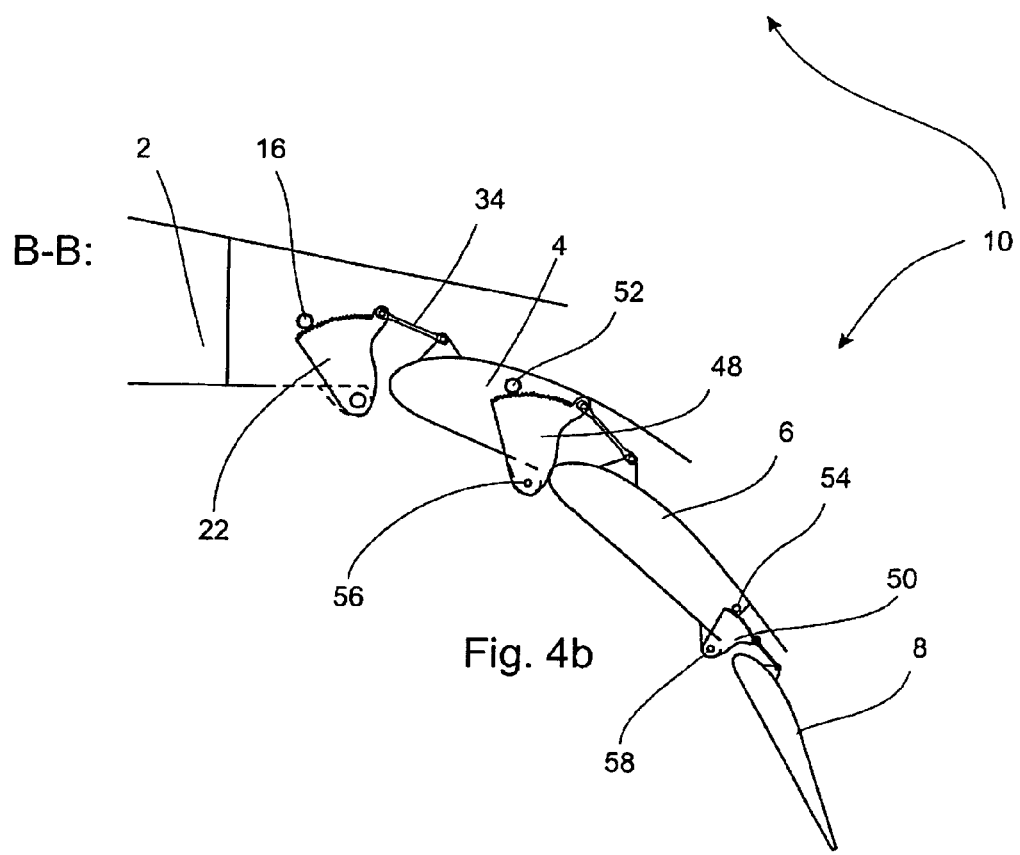

In an alternative exemplary embodiment, shown in FIGS. 4a and 4b, the flap segments 4, 6 and 8 are also deflected by toothed movement elements. To this effect toothed discs 22, 48 and 50 are used that are driven by pinions 16, 52 and 54. This exemplary embodiment is special in that the pinions 52 and 54 and the toothed discs 48 and 50 with their bearings 56 and 58 are directly arranged in the flap segments 4 and 6. This results in the drive units of the pinions 52 and 54 also being positioned in the flap segments 4 and 6, and the movements of the toothed discs 48 and 50 being transmitted to the flap segments 6 and 8 over a very short distance. The drive units of the pinions 52 and 54 can, for example, be implemented as electric motors that are directly connected to the pinions 52 and 54. Consequently this exemplary embodiment is less complex than the first exemplary embodiment.

If with a view to the drive loads a particular tooth arrangement between the pinions 52 and 54 and the toothed discs 48 and 50 is advantageous but does not match the rotary speeds of the drive units, the drive units can also be designed as gear motors, or transmissions can be interposed between the drive units and the pinions 16, 52 and 54.

FIG. 4b shows the trailing edge flap 10, deflected for high lift, of the second exemplary embodiment. The toothed discs 22, 48 and 50 have been completely deflected by the pinions 16, 52 and 54, analogous to the illustrations in FIGS. 3a-3c. Consequently the wing comprises a pronounced curvature and an increased surface and also comprises gaps.

Both exemplary embodiments shown can also be used for various flap positions during cruising. For this purpose all the flap segments 4, 6 and 8 can evenly or individually separate of each other be moved upwards or downwards. FIGS. 5a and 5b show exemplary flap positions for cruising with reference to the two exemplary embodiments in which the two rear flap segments 6 and 8 are deflected.

The exemplary embodiments do not limit the scope of the invention but instead are used to explain the characteristics according to the invention of the proposed device for moving a trailing edge flap of an aircraft. At all times other variants of the device according to the invention are imaginable, which variants comprise fewer or more than three flap segments if this is required or desired with reference to the aerodynamic design and the occurring loads, or if future regulations require higher lift coefficients. Furthermore, all the variants of the device according to the invention are imaginable that form part of the claims, irrespective of the use of push rods, or pinions and toothed movement elements arranged directly on the flap segments. Furthermore, the toothed discs shown can be of different shapes and can, for example, also be designed as toothed racks, which furthermore can be positioned independently of the hinge axis and/or of hinge fittings.

The invention claimed is:

1. A device for moving a trailing edge flap of an aircraft wing, in which the device form moving the trailing edge flap comprises:
    a first flap segment movably mounted to the wing,
    a first actuator mechanism, including: (i) a first toothed movement element that is movably coupled to the wing and moved by a first pinion, and (ii) a first push rod coupled at a first end to the first toothed movement element and at a second end to the first flap, wherein rotation of the first pinion causes movement of the first toothed movement element relative to the wing, translational movement of the first push rod, and movement of the first flap via the first push rod,
    a second flap segment rotationally coupled to the first flap segment by a flap hinge, and
    a second actuator mechanism, including: (i) a second toothed movement element that is movably coupled to one of the wing and the first flap segment and moved by a second pinion, and (ii) a second push rod coupled at a first end to the second toothed movement element and at a second end to the second flap, wherein rotation of the second pinion causes movement of the second toothed movement element relative to the one of the wing and the first flap segment, translational movement of the second push rod, and rotational movement, via the second push rod, of the second flap about the flap hinge relative to the first flap segment.

2. The device according to claim 1, wherein the first flap segment is rotationally connected to the wing by means of a first flap hinge, the flap hinge connecting the second flap segment to the first flap segment being a second flap hinge.

3. The device according to claim 1, wherein:
    the first and second pinions are driven by a shared central drive with one or several separate transmission stages, and
    the central drive is connected to one or several drive units directly or by way of one or several shafts.

4. The device according to claim 3, wherein the central drive for each of the first and second pinions comprises a separate transmission stage with a transmission output.

5. The device according to claim 3, wherein each transmission stage comprises at least one of: a device for braking the transmission output and a coupling device for coupling of the respective transmission output.

6. The device according to claim 4, wherein each of the first and second pinions are in each case driven by an independent drive unit.

7. The device according to claim 6, wherein the independent drive unit is arranged in the wing or in the flap segment on which the flap segment to be moved is held.

8. The device according to claim 1, wherein the first and second toothed movement elements are designed as bodies that at least in some regions are disc-shaped with a circumferential area that at least in some regions includes teeth for mating with a respective one of the first and second pinions.

9. The device according to claim 1, wherein the first and second toothed movement elements are designed as respective toothed racks.

10. The device according to claim 2, further comprising:
    at least a third flap segment rotationally coupled to the second flap segment by a third flap hinge, and
    at least a third actuator mechanism, including: (i) a third toothed movement element that is movably coupled to one of the wing and the second flap segment and moved by a third pinion, and (ii) a third push rod coupled at a first end to the third toothed movement element and at a second end to the third flap, wherein rotation of the third pinion causes movement of the third toothed movement element relative to the one of the wing and the second flap segment, translational movement of the third push rod, and rotational movement, via the third push rod, of the third flap about the third flap hinge relative to the second flap segment.

11. The device according to claim 1, wherein the first toothed movement element is rotationally coupled to the wing about an actuator hinge and rotated by the first pinion, and rotation of the first pinion causes rotation of the first toothed movement element about the actuator hinge, translational movement of the first push rod, and movement of the first flap via the first push rod.

12. The device according to claim 1, wherein:
the second toothed movement element is rotationally coupled to the one of the wing and the first flap segment about an actuator hinge and rotated by the second pinion, and rotation of the second pinion causes rotation of the second toothed movement element about the actuator hinge, translational movement of the second push rod, and rotational movement, via the second push rod, of the second flap about the flap hinge relative to the first flap segment, and
a rotation axis of the second actuator hinge is not coaxial with a rotational axis of the flap hinge.

13. The device according to claim 10, wherein:
the third toothed movement element is rotationally coupled to the one of the wing and the second flap segment about a third actuator hinge and rotated by the third pinion, and rotation of the third pinion causes rotation of the third toothed movement element about the third actuator hinge, translational movement of the third push rod, and rotational movement, via the third push rod, of the third flap about the third flap hinge relative to the second flap, and
a rotation axis of the third actuator hinge is not coaxial with a rotational axis of the third flap hinge.

14. An aircraft, comprising:
a first flap segment rotationally coupled to the wing by a first flap hinge,
a first actuator mechanism, including: (i) a first toothed movement element that is rotationally coupled to the wing and rotated by a first pinion, and (ii) a first push rod coupled at a first end to the first toothed movement element and at a second end to the first flap, wherein rotation of the first pinion causes rotation of the first toothed movement element relative to the wing, translational movement of the first push rod, and rotational movement, via the first push rod, of the first flap about the first flap hinge with respect to the wing,
a second flap segment rotationally coupled to the first flap segment by a second flap hinge,
a second actuator mechanism, including: (i) a second toothed movement element that is rotationally coupled to one of the wing and the first flap segment and rotated by a second pinion, and (ii) a second push rod coupled at a first end to the second toothed movement element and at a second end to the second flap, wherein rotation of the second pinion causes rotation of the second toothed movement element relative to the one of the wing and the first flap segment, translational movement of the second push rod, and rotational movement, via the second push rod, of the second flap about the second flap hinge relative to the first flap segment,
at least a third flap segment rotationally coupled to the second flap segment by a third flap hinge, and
at least a third actuator mechanism, including: (i) a third toothed movement element that is rotationally coupled to one of the wing and the second flap segment and rotated by a third pinion, and (ii) a third push rod coupled at a first end to the third toothed movement element and at a second end to the third flap, wherein rotation of the third pinion causes rotational movement of the third toothed movement element relative to the one of the wing and the second flap segment, translational movement of the third push rod, and rotational movement, via the third push rod, of the third flap about the third flap hinge relative to the second flap segment.

* * * * *